United States Patent

Wünsch et al.

[11] Patent Number: 6,121,391
[45] Date of Patent: Sep. 19, 2000

[54] PROCESS FOR THE PREPARATION OF POLYMERISATES OF VINYL AROMATIC COMPOUNDS IN A STAGE USING DOUBLE SCREW EXTRUDERS

[75] Inventors: Josef Wünsch, Schifferstadt; Jürgen Hofmann, Ludwigshafen; Thomas Kessler, Schifferstadt; David Fischer, Gönnheim, all of Germany

[73] Assignee: BASF Aktiengesellschaft, Ludwigshafen, Germany

[21] Appl. No.: 09/077,607

[22] PCT Filed: Dec. 2, 1996

[86] PCT No.: PCT/EP96/05332

§ 371 Date: Jun. 2, 1998

§ 102(e) Date: Jun. 2, 1998

[87] PCT Pub. No.: WO97/21742

PCT Pub. Date: Jun. 19, 1997

[30] Foreign Application Priority Data

Dec. 11, 1995 [DE] Germany ............ 195 46 096

[51] Int. Cl.[7] ................ C08F 2/02; C08F 12/08
[52] U.S. Cl. ............ 526/65; 526/88; 526/153; 526/160; 526/346; 264/211.24; 264/331.17
[58] Field of Search .................. 526/65, 88, 160, 526/346, 153; 264/211.24, 331.17

[56] References Cited

U.S. PATENT DOCUMENTS

| | | |
|---|---|---|
| 4,794,096 | 12/1988 | Ewen . |
| 5,164,479 | 11/1992 | Funaki et al. ............ 528/502 F |
| 5,254,647 | 10/1993 | Yamamoto et al. ........... 526/88 X |
| 5,597,879 | 1/1997 | Ase et al. ................. 526/65 |

FOREIGN PATENT DOCUMENTS

| | | |
|---|---|---|
| 379 128 | 7/1990 | European Pat. Off. . |
| 522 641 | 1/1993 | European Pat. Off. . |
| 584 646 | 3/1994 | European Pat. Off. . |
| 93/03067 | 2/1993 | WIPO . |
| 97/21742 | 6/1997 | WIPO . |

OTHER PUBLICATIONS

Jrl. Org. Chem., 369, 1989, p. 359–370.

Beilstein, 5, 367, 474, 485.

*Primary Examiner*—Fred Teskin
*Attorney, Agent, or Firm*—Keil & Weinkauf

[57] ABSTRACT

Polymers of vinylaromatic compounds are prepared at from −80 to 150° C. in the presence of metallocene catalyst systems by a process in which polymerization is carried out in one stage with the use of a closely intermeshing twin-screw extruder having corotating screws.

6 Claims, No Drawings

PROCESS FOR THE PREPARATION OF POLYMERISATES OF VINYL AROMATIC COMPOUNDS IN A STAGE USING DOUBLE SCREW EXTRUDERS

The present invention relates to processes for the preparation of polymers of vinylaromatic compounds at from −80 to 150° C. in the presence of metallocene catalyst systems.

The present invention furthermore relates to the use of the resulting polymers for the production of fibers, films and moldings and to the fibers, films and moldings obtainable therefrom.

Owing to their property profile, polymers of vinylaromatic compounds, in particular polystyrenes, are used in many areas, for example as packaging materials or as insulating coatings for metals or plastics, especially for electrical applications.

EP-A 584 646 describes processes for evaporation of syndiotactic polystyrene in continuously operated, horizontal reactors, but catalyst mixtures and monomer have to be repeatedly metered in for efficient conversion of monomers. Furthermore, the activators have to be metered in separately from the monomers and from the transition metal catalysts.

EP-A 379 128 likewise discloses a process for the preparation of syndiotactic polystyrene in continuously operated, horizontal reactors. However, there is an acute danger of sticking during discharge from the reactor, with the result that continuous operation cannot be guaranteed. In addition, the degree of self-purging is very low in this process.

It is an object of the present invention to provide novel processes for the preparation of polymers of vinylaromatic compounds which processes do not have the stated disadvantages and in particular are not very complicated in terms of process engineering.

We have found that this object is achieved by processes for the preparation of polymers of vinylaromatic compounds at from −80 to 150° C. in the presence of metallocene catalyst systems, wherein polymerization is carried out in one stage with the use of a closely intermeshing twin-screw extruder having corotating screws.

We have also found the use of the resulting polymers for the production of fibers, films and moldings, and the fibers, films and moldings obtainable therefrom.

Particularly suitable vinylaromatic compounds are compounds of the formula I

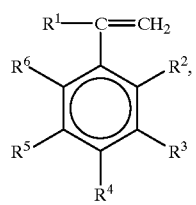

(I)

wherein
$R^1$ is hydrogen or $C_1$–$C_4$-alkyl,
$R^2$ to $R^6$, independently of one another, are each hydrogen, $C_1$–$C_{12}$-alkyl, $C_6$–$C_{18}$-aryl or halogen or two neighboring radicals together form a cyclic group of 4 to 15 carbon atoms.

Preferably used vinylaromatic compounds of the formula I are those in which
$R^1$ is hydrogen
and
$R^2$ to $R^6$ are each hydrogen, $C_1$–$C_4$-alkyl, chlorine or phenyl or two neighboring radicals together form a cyclic group of 4 to 12 carbon atoms, so that examples of compounds of the formula I are naphthalene derivatives or anthracene derivatives.

Examples of such preferred compounds are:
styrene, p-methylstyrene, p-chlorostyrene, 2,4-dimethylstyrene, 4-vinylbiphenyl, 2-vinylnaphthalene and 9-vinylanthracene.

Mixtures of different vinylaromatic compounds may also be employed, but preferably only one vinylaromatic compound is used.

Particularly preferred vinylaromatic compounds are styrene and p-methylstyrene.

The preparation of vinylaromatic compounds of the formula I is known per se and is described, for example, in Beilstein 5, 367, 474 and 485.

In the novel processes, preferably used metallocene complexes A) are those of the formula II

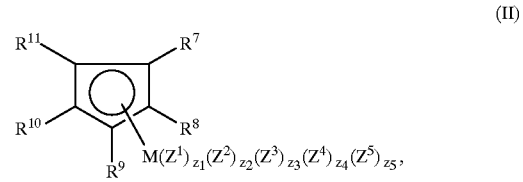

(II)

wherein
$R^7$ to $R^{11}$ are each hydrogen, $C_1$–$C_{10}$-alkyl, 5- to 7-membered cycloalkyl, which in turn may carry $C_1$–$C_6$-alkyl groups as substituents, or $C_6$–$C_{15}$-aryl or arylalkyl, or two neighboring radicals together may furthermore form a cyclic group of 4 to 15 carbon atoms, or $Si(R^{12})_3$,
$R^{12}$ is $C_1$–$C_{10}$-alkyl, $C_6$–$C_{15}$-aryl or $C_3$–$C_{10}$-cycloalkyl,
M is a metal of subgroup III to VI of the Periodic Table of Elements or a metal of the lanthanide series,
$Z^1$ to $Z^5$ are each hydrogen, halogen, $C_1$–$C_{10}$-alkyl, $C_6$–$C_{15}$-aryl, $C_1$–$C_{10}$-alkoxy or $C_1$–$C_{15}$-aryloxy
and
$z_1$ to $z_5$ are each 0, 1, 2, 3, 4 or 5, the sum $z_1+z_2+z_3+z_4+z_5$ corresponding to the valency of M minus 1.

Particularly preferred metallocene complexes of the formula II are those in which
M is a metal of subgroup IV of the Periodic Table of Elements, ie. titanium, zirconium or hafnium, in particular titanium,
and
$Z^1$ to $Z^5$ are each $C_1$–$C_{10}$-alkyl, $C_1$–$C_{10}$-alkoxy or halogen.

Examples of such preferred metallocene complexes are:
pentamethylcyclopentadienyltitanium trichloride,
pentamethylcyclopentadienyltitanium trimethyl and
pentamethylcyclopentadienyltitanium trimethylate.

Metallocene complexes as described in EP-A 584 646 may also be used.

Mixtures of different metallocene complexes may also be employed.

The synthesis of such complex compounds can be carried out by methods known per se, the reaction of the appropriately substituted, cyclic hydrocarbon anions with halides of titanium, zirconium, hafnium, vanadium, niobium or tantalum being preferred.

Examples of appropriate preparation processes are described, inter alia, in Journal of Organometallic Chemistry, 369 (1989), 359–370.

The catalyst systems may contain open-chain or cyclic aluminoxane compounds as compound B) forming metallocene ions.

For example, open-chain or cyclic aluminoxane compounds of the formula IV or V

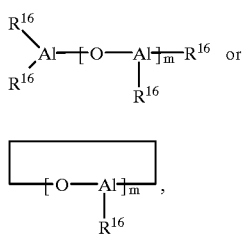

where $R^{16}$ is $C_1$–$C_4$-alkyl, preferably methyl or ethyl, and m is an integer from 5 to 30, preferably from 10 to 25, are suitable.

The preparation of these oligomeric aluminoxane compounds is usually carried out by reacting a solution of trialkylaluminum with water and is described, inter alia, in EP-A 284 708 and U.S. Pat. No. 4,794,096.

As a rule, the oligomeric aluminoxane compounds obtained are present as mixtures of both lienar and cyclic chain molecules of different lengths, so that m is to be regarded as an average value. The aluminoxane compounds may also be present as a mixture with other metal alkyls, preferably with alkylaluminum.

It has proven advantageous to use the metallocene complexes and the oligomeric aluminoxane compound in amounts such that the atomic ratio of aluminum from the oligomeric aluminoxane compound to the transition metal from the metallocene complexes is from 10:1 to $10^6$:1, in particular from 10:1 to $10^4$:1.

Coordination complexes selected from the group consisting of the strong, neutral Lewis acids, the ionic compounds having Lewis acid cations and the ionic compounds having Brönsted acids as cations may also be used as compound (B) forming metallocenium ions.

Preferred strong neutral Lewis acids are compounds of the formula VI

      VI where
$M^1$ is an element of main group III of the Periodic Table, in particular B, Al or Ga, preferably B,
$X^1$, $X^2$ and $X^3$ are each hydrogen, $C_1$–$C_{10}$-alkyl, $C_6$–$C_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloaryl, preferably pentafluorophenyl.

Particularly preferred compounds of the formula VI are those in which $X^1$, $X^2$ and $X^3$ are identical, preferably tris(pentafluorophenyl)borane. These compounds and processes for their preparation are known per se and are described, for example, in WO 93/3067.

Suitable ionic compounds having Lewis acid cations are compounds of the formula VII

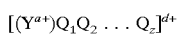      VII where
Y is an element of the main group I to VI or of subgroup I to VIII of the Periodic Table,
$Q_1$ to $Q_z$ are radicals having a single negative charge, such as $C_1$–$C_{28}$-alkyl, $C_6$–$C_{15}$-aryl, alkylaryl, arylalkyl, haloalkyl, haloaryl, each having 6 to 20 carbon atoms in the aryl radical and 1 to 28 carbon atoms in the alkyl radical, $C_1$–$C_{10}$-cycloalkyl which may be substituted by $C_1$–$C_{10}$-alkyl, or halogen, $C_1$–$C_{28}$-alkoxy, $C_6$–$C_{15}$-aryloxy, silyl or mercaptyl,
a is an integer from 1 to 6,
z is an integer from 0 to 5 and
d corresponds to the difference a-z, but d is greater than or equal to 1.

Carbonium cations, oxonium cations and sulfonium cations and cationic transition metal complexes are particularly suitable. Particular examples are the triphenylmethyl cation, the silver cation and the 1,1'-dimethylferrocenyl cation.

They preferably have noncoordinating opposite ions, in particular boron compounds, as also mentioned in WO 91/09882, preferably tetrakis(pentafluorophenyl)borate.

Ionic compounds having Brönsted acids as cations and preferably likewise noncoordinated opposite ions are mentioned in WO 93/3067, a preferred cation being N,N-dimethylanilinium.

It has proven particularly suitable if the molar radio of boron from the compound forming metallocenium ions to the transition metal from the metallocene complex is from 0.1:1 to 10:1, in articular from 1:1 to 5:1.

The catalyst system used in the novel process contains, as component C), an aluminum compound of the formula III

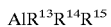      (III), where
$R^{13}$ to $R^{15}$ are each fluorine, chlorine, bromine, iodine or $C_1$–$C_{12}$-alkyl, preferably $C_1$–$C_8$-alkyl.

Preferably, $R^{13}$ to $R^{15}$ are identical and are each methyl, ethyl, isobutyl or n-hexyl.

The component C) is preferably contained in the catalyst system in an amount of from 2000:1 to 1:1, particularly from 800:1 to 10:1 (molar ratio of Al from III to transition metal from II).

Aromatic hydrocarbons, preferably those of 6 to 20 carbon atoms, in particular xylenes and toluene and mixtures thereof, are usually used as solvents for the metallocene complexes.

The metallocene complexes may be employed on a carrier or without a carrier.

Suitable carriers are, for example, silica gels, preferably those of the formula $SiO_2 \cdot bAl_2O_3$, where b is from 0 to 2, preferably from 0 to 0.5, ie. essentially aluminosilicates or silica. The carriers preferably have a particle diameter of from 1 to 200 μm, preferably from 30 to 80 μm. Such products are commercially available, for example Silica Gel 332 from Grace.

Further carriers include finely divided polyolefins, for example finely divided polypropylene or polyethylene, as well as polyethylene glycol, polybutylene terephthalate, polyethylene terephthalate, polyvinyl alcohol, polystyrene, polybutadiene, polycarbonates or copolymers thereof.

The novel process is carried out in one stage with the use of a closely intermeshing and hence self-purging twin-screw extruder having corotating screws.

The reaction temperature is from –80 to 150° C., preferably from 0° to 120° C. However, it is also possible to apply a temperature gradient from 0 to 120° C. by means of heatable barrel jackets around the reaction tube.

The extruder may consist of a plurality of individual zones which may be heated to different temperatures.

The external diameter of the corotating, preferably two-flight kneading and conveying elements of the twin-screw extruder is preferably from 25 to 70 mm, in particular from 30 to 58 mm.

The free spaces between extruder barrel and screw element are from 0.2 to 0.8 mm, in particular from 0.3 to 0.5 mm.

The screw speed is from 3 to 500, preferably from 3 to 30, revolutions per minute.

The average residence time in the extruder may be from 0.1 to 240, preferably from 2 to 20, minutes.

The average residence time in the extruder can be regulated by means of a number of barrel blocks. The number of barrel blocks is preferably from 6 to 20, in particular from 8 to 12. Particularly preferably, 10 barrel blocks are used, back devolatilization taking place in the first barrel block, the starting materials being metered into the second barrel block, barrel blocks 3 to 8 being reaction barrel blocks, it being possible to take barrel blocks 9 and 10 to another temperature and barrel block 10 serving as discharge barrel.

The novel process is preferably carried out by a method in which the vinylaromatic compound, the compound B) forming metallocenium ions and the aluminum compound C) are mixed under an inert gas atmosphere and are metered into the first barrel block of the extruder. At the same time, a solution or suspension of the metallocene complex A) may be metered into the first barrel block (zone).

Examples of solvents or suspension media are cyclic and acyclic hydrocarbons, such as butanes, pentanes, hexanes or heptanes, and furthermore aromatic hydrocarbons, such as benzene, toluene or ethylbenzene, and oxygen-containing hydrocarbons, such as tetrahydrofuran, halogen-containing hydrocarbons, such as dichloromethane, or nitrogen-containing hydrocarbons, such as N-methylpiperidine, and mixtures thereof.

The metered amount is preferably chosen so that 500 to 2000 g/h of the mixture of vinylaromatic compound and components B) and C) and from 100 to 200 cm$^3$/h of the solution or suspension of the metallocene complex are fed in.

The polymerization is preferably carried out in the vinylaromatic compound as reaction medium, ie. in the absence of a solvent or diluent.

The novel process is technically simple to carry out, high conversions are achieved, the danger of sticking or of blockage of the outlet orifice of the extruder is small and the resulting polymers are syndiotactic and are particularly suitable for use as molding materials in electrical applications or applications where resistance to high temperatures is required.

EXAMPLES

Examples 1 to 4: Preparation of syndiotactic polystyrene (s-PS)

Examples 1 and 2: Preparation of s-PS using methylaluminoxane (MAO)

Example 1

12.0 kg of styrene (115.2 mol) were mixed with 1.642 kg of MAO (2.881 mol) (from Witco) and 1.427 kg of triisobutylaluminum (1.440 mol) (from Witco) under inert gas (nitrogen) and metered by means of a gearpump (from Feinprüf) into a ZE 40A twin-screw extruder (from Berstorff) at a rate of 1 kg of mixture per hour. The temperature in the first barrel block was 61° C. and the temperature was kept constant over all 10 barrel blocks. Simultaneously with the metering of this mixture, 2.1912 g (0.0096 mol) of (pentamethylcyclopentadienyl)trimethyltitanium, dissolved in 1.2 l of toluene, were also metered into the first barrel block by means of an LEWA reciprocating pump (from M3) at a rate of 100 ml of solution per hour.

The resulting s-PS was removed in the form of powder at the top of the extruder.

Example 2

The procedure was as in Example 1, except that the temperature in the second barrel block was 61° C., the temperature was kept constant over 6 barrel blocks and the temperature was 100° C. in the last two barrel blocks.

Examples 3 and 4: Preparation of s-PS using tris(pentafluorophenyl)borane

Example 3

12.0 kg of styrene (115.2 mol) were mixed with 4.903 g of tris(pentafluorophenyl) borane (0.0096 mol) and 95.19 g of triisobutylaluminum (0.48 mol) (from Witco) under inert gas (nitrogen) and metered by means of a gearpump (from Feinprüf) into a ZE 40A twin-screw extruder (from Berstorff) at a rate of 1 kg of mixture per hour. The temperature in the first barrel block was 61° C. and the temperature was kept constant over all 10 barrel blocks. Simultaneously with the metering of this mixture, 2.1912 g (0.0096 mol) of (pentamethylcyclopentadienyl)trimethyltitanium, dissolved in 1.2 l of touene, were also metered into the first barrel block by means of an LEWA reciprocating pump (from M3) at a rate of 100 ml of solution per hour.

The resulting s-PS was removed in the form of powder at the top of the extruder.

Example 4

The procedure was as in Example 3, except that the temperature in the second barrel block was 61° C., the temperature was kept constant over 6 barrel blocks and the temperature was 100° C. in the last two barrel blocks.

The Table below provides information about the conversion and the polymer properties.

The molecular weight $M_w$ (weight average) and $M_n$ (number average) were determined by gel permeation chromatography using 1,2,4-trichlorobenzene as solvent at 135° C. The calibration was carried out using polystyrene standards having a narrow distribution. The syndiotactic fractions were determined by $^{13}$C-NMR.

| Example | Conversion [%] | $M_w$ | $M_w/M_n$ | syndiotactic fraction [%] |
|---|---|---|---|---|
| 1 | 79 | 121,000 | 1.77 | 99.2 |
| 2 | 84 | 264,000 | 2.09 | 99.6 |
| 3 | 73 | 262,000 | 2.13 | 97.1 |
| 4 | 82 | 298,000 | 1.99 | 98.1 |

We claim:

1. A process for the preparation of polymers of vinylaromatic compounds at from −80 to 150° C. in the presence of metallocene catalyst systems, which process is carried out in one stage in a self-purging twin-screw extruder having corotating screws, and having an extruder barrel comprising a plurality of barrel sections, by first separately providing i) a first mixture in the form of a solution or suspension of one or more metallocene complexes of the formula II

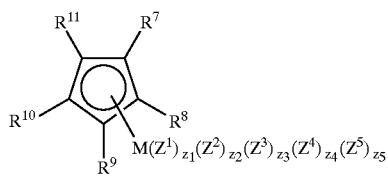

(II)

wherein
- $R^7$ to $R^{11}$ are each hydrogen, $C_1$–$C_{10}$-alkyl, 5- to 7-membered cycloalkyl, which in turn may carry $C_1$–$C_6$-alkyl groups as substituents, or $C_6$–$C_{15}$-aryl or arylalkyl, or two neighboring radicals together may furthermore form a cyclic group of 4 to 15 carbon atoms, or $Si(R^{12})_3$,
- $R^{12}$ is $C_1$–$C_{10}$-alkyl, $C_6$–$C_{15}$-aryl or $C_3$–$C_{10}$-cycloalkyl,
- M is a metal of subgroup III to VI of the Periodic Table of the Elements or a metal of the lanthanide series,
- $Z^1$ to $Z^5$ are each hydrogen, halogen, $C_1$–$C_{10}$-alkyl, $C_6$–$C_{15}$-aryl, $C_1$–$C_{10}$-alkoxy or $C_1$–$C_{15}$-aryloxy, and
- $z_1$ to $z_5$ are each 0, 1, 2, 3, 4 or 5, the sum of $z_1+z_2+z_3+z_4+z_5$ corresponding to the valency of M minus 1, and ii) a second mixture comprising the vinylaromatic compounds and additionally (B) a compound capable of forming metallocenium ions, and (C) an aluminum compound of the formula III

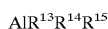

(III)

wherein
- $R^{13}$ to $R^{15}$ are each fluorine, chlorine, bromine, iodine or $C_1$–$C_{10}$-alkyl, subsequently, separately and at the same time, metering said first mixture and said second mixture into a first or a second barrel section of the extruder barrel, polymerizing the vinylaromatic compounds in the subsequent sections of the extruder barrel to give the polymer, and discharging the polymer from the extruder barrel at the last barrel section.

2. The process defined in claim 1, wherein the vinylaromatic compounds are of the formula I

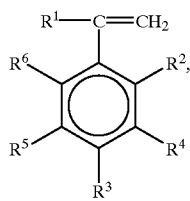

I where
- $R^1$ is hydrogen or $C_1$–$C_4$-alkyl, and
- $R^2$ to $R^6$, independently of one another, are each hydrogen, $C_1$–$C_{12}$-alkyl, $C_6$–$C_{18}$-aryl or halogen or two neighboring radicals together form a cyclic group of 4 to 15 carbon atoms.

3. The process defined in claim 1, wherein component B) is an aluminum compound of the formula IV or V

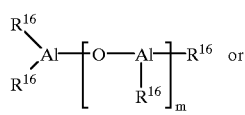

IV

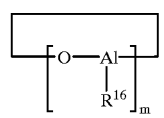

V where $R^{16}$ is $C_1$–$C_4$-alkyl and m is an integer from 5 to 30.

4. The process defined in claim 1, wherein component B) is a coordination complex selected from the group consisting of the strong, neutral Lewis acids, the ionic acids having Lewis acid cations and the ionic compounds having Brönsted acids as cations.

5. The process defined in claim 2, wherein component B) is an aluminum compound of the formula IV or V

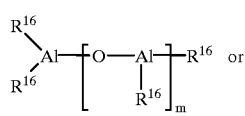

IV

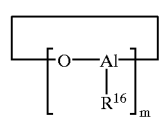

V where $R^{16}$ is $C_1$–$C_4$-alkyl and m is an integer from 5 to 30.

6. The process defined in claim 2, wherein component B) is a coordination complex selected from the group consisting of the strong, neutral Lewis acids, the ionic acids having Lewis acid cations and the ionic compounds having Brönsted acids as cations.

* * * * *

UNITED STATES PATENT AND TRADEMARK OFFICE
CERTIFICATE OF CORRECTION

PATENT NO.: 6,121,391

DATED: September 19, 2000

INVENTOR(S): WUENSCH et al.

It is certified that error appears in the above-identified patent and that said Letters Patent is hereby corrected as shown below:

Col. 17, clai8m 1, line 47, "$C_1$-$C_{19}$-alkyl" should be --$C_1$-$C_{12}$-alkyl--.

Signed and Sealed this

Twenty-fourth Day of April, 2001

Attest:

NICHOLAS P. GODICI

Attesting Officer

Acting Director of the United States Patent and Trademark Office